United States Patent
Dwarakanath et al.

[19]

[11] Patent Number: 5,862,187
[45] Date of Patent: Jan. 19, 1999

[54] MPSK DEMODULATOR

[75] Inventors: Mirmira Ramarao Dwarakanath, Warren, N.J.; Kadaba R. Lakshmikumar, Wescosville; Angelo Rocco Mastrocola, West Lawn, both of Pa.; Krishnaswamy Nagaraj, Somerville, N.J.; Douglas Edward Sherry, Mertztown, Pa.

[73] Assignee: Lucent Technologies Inc., Murray Hill, N.J.

[21] Appl. No.: 509,563

[22] Filed: Jul. 31, 1995

[51] Int. Cl.$^6$ ..................................... H04L 27/22
[52] U.S. Cl. ........................ 375/332; 375/324; 375/329; 329/304
[58] Field of Search ................... 375/324–326, 375/329, 332, 340, 342, 350, 355, 371, 373; 329/304, 310

[56] References Cited

U.S. PATENT DOCUMENTS

| | | | |
|---|---|---|---|
| 4,317,210 | 2/1982 | Dekker et al. | 375/319 |
| 4,379,284 | 4/1983 | Boykin | 340/310 R |
| 4,389,616 | 6/1983 | Gockler et al. | 395/371 |
| 4,563,650 | 1/1986 | York et al. | 375/332 X |
| 4,580,277 | 4/1986 | Angello et al. | 375/308 |
| 5,130,798 | 7/1992 | Christopher | 348/620 |
| 5,203,023 | 4/1993 | Saito et al. | 455/133 |

OTHER PUBLICATIONS

"A 2.5–Gb/sec 15–mW BiCMOS Clock Recovery Circuit", AT&T By: Behzad Rasavi and James Sung.
WP 3.6:"A 500MHz Time Digitizer IC with 15.625ps Resolution" By:T. Knotts, D. Chu, J.
"A 30–MHz Hybrid Analog/Digital Clock Recovery Circuit in 2–um CMOS" By: B. Kim,D. Helman, P. Gray, IEEE Dec. 1990, pp. 1385–1394.

Session 11: High–Sped Communication IC's FAm 11.5: A Monolithic CMOS 10MHz DPLL for Burst–Mode Data Retiming By: Jeff Sourrley and Robert Loonowich.

WP 3.2: A CMOS Multi–Channel IC for Pulse Timing Measurements with 1mV Sensitivity By: M> Loinaz and B. Wooley.

Session 11: High–Speed communication IC's FAM 11.5 A Monolithic CMOS 10MHz DPLL for Burst–Mode Data Retiming By: Jeff Sourrley and Robert Loonowich.

WP 3.2: A CMOS Multi–Channel IC for Pulse Timing Measurements with 1mV Sensitivity by: Loinaz, J. and Wooley, Bruce A.

*Primary Examiner*—Young T. Tse

[57] ABSTRACT

A receiver for decoding passband signal pulses transmitted in accordance with a M-ARY phase shift keying modulation scheme, comprises a multiphase sampler for sampling received passband signal pulses in the passband frequency range so as to generate a plurality of digital words corresponding to the sampled passband signal pulses, such that each digital word represents the phase of each sampled passband signal pulse. A phase reference register or other storage device is coupled to the multiphase sampler for storing one of the digital words as a phase reference such that other digital words generated by the multiphase sampler are compared with the digital word corresponding to the phase reference for decoding the passband signal pulses.

19 Claims, 6 Drawing Sheets

MPSK DEMODULATOR

RELATED APPLICATIONS

This patent application is related to concurrently filed patent application Ser. No. 08/509,673, issued as U.S. Pat. No. 5,565,817, entitled "RING OSCILLATOR," (Lakshmikumar 5) by K. Lakshmikumar, and incorporated herein by reference; concurrently filed patent application Ser. No. 08/509,562, issued as U.S. Pat. No. 5,642,077 entitled "WIDE BAND CONSTANT GAIN AMPLIFIER," (Nagaraj 15) by K. Nagaraj, and incorporated herein by reference; and concurrently filed patent application Ser. No. 08/509,072, issued as Pat. No. 5,619,125 entitled "VOLTAGE-TO-CURRENT CONVERTER," (Lakshmikumar 6) by K. Lakshmikumar, and incorporated herein by reference.

TECHNICAL FIELD

The present invention relates to communication systems, and more particularly, to a communication system employing M-ARY Phase Shift Keying (MPSK).

BACKGROUND OF THE INVENTION

In a typical communication system, it is often desirable to modulate a carrier with baseband signals to be transmitted, where the carrier frequency is many times higher than the frequency of the baseband signals to be transmitted. This modulation scheme, typically, employs a multiplier that multiplies the baseband signal with an output signal of a local oscillator. The resulting signal, in this context, referred to as a passband signal, comprises a version of the baseband signal shifted into the carrier frequency range.

Figure 2:
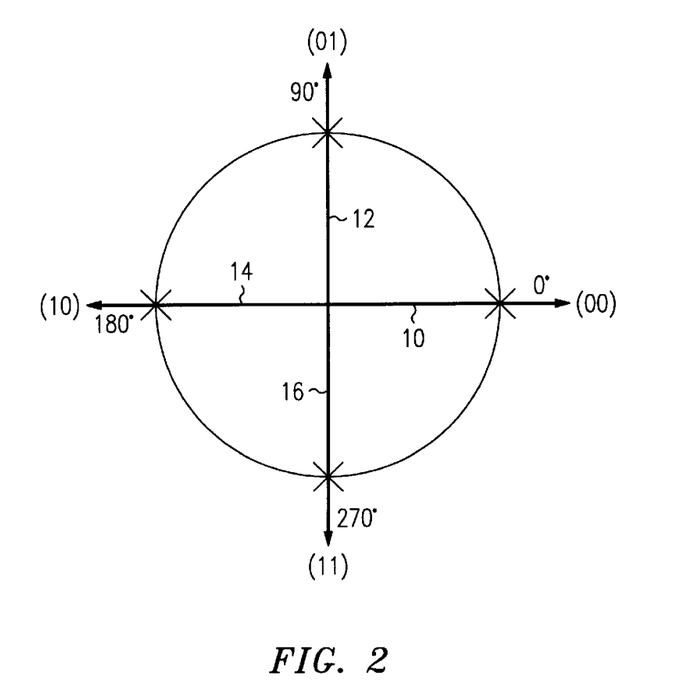
FIG. 2 is a plot illustrating a signal constellation relating to a typical QPSK modulation scheme.

One type of modulation scheme employed in many communication systems is referred to as M-ARY phase shift keying, where M is a positive integer. This type of signal modulation is well-known and described, for example, in *Information, Transmission, Modulation and Noise*, by Mischa Schwartz, McCraw Hill (3rd ed.) 1980. Basically, phase shift keying is a signal encoding scheme, where one or more data bits may be represented by a symbol signal having a given amplitude and a given phase. One type of M-ARY phase shift keying is Quadrature Phase Shift Keying or QPSK. According to this scheme, two binary bits may be represented by a symbol signal having different phases approximately 90° apart. FIG. 2 illustrates a signal constellation for a QPSK modulation scheme. For example, data bits "00" correspond to a symbol signal that may be represented by phasor 10, having a given amplitude and "zero" phase. Data bits "01" correspond to a symbol signal that may be represented by phasor 12, having substantially the same amplitude as phasor 10, and a phase shift of $\pi/2$ radians. Data bits "10" correspond to a symbol signal that may be represented by phasor 14, having a phase shift of $\pi$ radians. Likewise, data bits "11" correspond to a symbol signal that may be represented by phasor 16, having a phase shift of $3\pi/2$ radians.

Conventional communication receivers have a substantially complex arrangement for M-ARY phase shift keying demodulation. Typically, these systems include a frequency tracking module to determine or recover the carrier signal of the incoming transmitted signal, a multiplier to convert the incoming signal from a passband to a baseband frequency region, and filters for smoothing noise signals. The design arrangement of conventional M-ARY demodulators, therefore, typically includes complex analog circuitry. This arrangement also typically includes digital circuitry for processing the incoming recovered data bits. Although, it is typically difficult to implement an integrated circuit M-ARY demodulator that includes both analog and digital circuitry, providing such a demodulator on a chip may provide advantages in terms of convenience and cost. Hence, there is a need for a M-ARY demodulator that can be implemented on a single integrated circuit chip.

Furthermore, the conventional process of determining the carrier signal of an incoming transmitted signal is substantially time consuming. The time required to determine the carrier signal may not be acceptable for burst mode communications. In a typical burst mode communication system, like time division multiple access (TDMA), for example, a plurality of transmitters send signals over the same channel to one receiver. Each transmitter sends signal bursts or packets of information that include a preamble portion that is used by the receiver to identify the transmitter and to determine the carrier signal for the duration of the burst. The receiver continually receives these bursts of information, which are spaced apart by a substantially short idle period. Due, at least in part, to the relatively long time involved to recover a carrier signal, and furthermore, due to the complexity of a conventional circuit configured to multiply and filter the incoming signals to convert them into the baseband region, conventional demodulators may not be appropriate for high bit-rate burst mode communications.

Thus, a need exists for a M-ARY demodulator that is suitable even for a high-bit rate burst mode communications environment and that has an integrated circuit arrangement.

SUMMARY OF THE INVENTION

Briefly, in accordance with one aspect of the present invention, a receiver for decoding passband signal pulses transmitted in accordance with a M-ARY phase shift keying modulation scheme, comprises: a multiphase sampler for sampling passband signal pulses in the passband frequency range so as to generate a digital word corresponding to the sampled passband signal pulse, the digital word representing the phase of said sampled passband signal pulse; and a phase reference register coupled to the multiphase sampler for storing one of the digital words as a phase reference, such that other digital words generated by the multiphase sampler are compared with the digital word corresponding to the phase reference for decoding the passband signal pulses.

Briefly, in accordance with another aspect of the invention, a method for demodulating MPSK signal bursts, each burst including periodic signal pulses, the method comprising the steps of: sampling the signal pulses so as to generate digital words, each generated digital word representing the phase of a sampled signal pulse; generating a data sampling clock signal in response to the digital words corresponding to a predetermined set of transmitted signal pulses; and retrieving selected generated digital words in accordance with the data sampling clock signal.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE DRAWINGS

Figure 3:
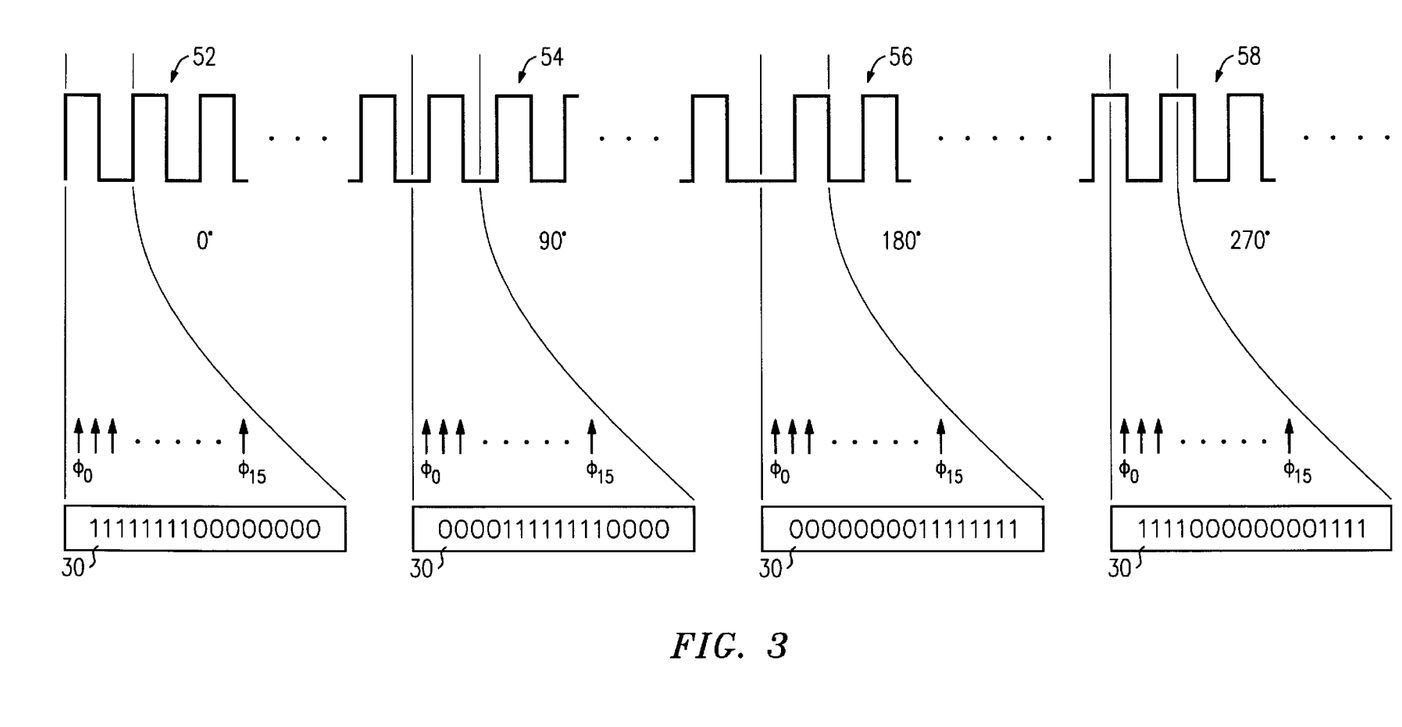
FIG. 3 is a schematic diagram illustrating QPSK signal bursts that respectively correspond to phasors in the signal constellation represented in FIG. 1.

In one embodiment in accordance with the present invention, QPSK symbols may be transmitted at a given or predetermined carrier frequency. For example, FIG. 3 illustrates four sets 52, 54, 56 and 58 including QPSK signal pulses that respectively correspond to phasors 10, 12, 14 and 16 in the constellation signal scheme represented in FIG. 2. Each of these sets comprises a bit stream of signal pulses that correspond to a given phase. Thus, for example, in this particular embodiment, signal pulses in set 52 correspond to a 0° phase shift. Likewise, signal pulses in set 54 correspond to a 90° phase shift. Signal pulses in set 56 correspond to a 180° phase shift. Finally, signal pulses in set 58 corresponds to a 270° phase shift. Although the invention is not restricted in scope in this respect, each signal pulse corresponds to one symbol or two bits. This one symbol is sent respectively to form a set of signal pulses. Therefore, for this particular embodiment, a set of signal pulses also corresponds to one symbol or two bits. It will be appreciated that for other M-ARY phase shift keying modulation schemes, there may be other sets of signal pulses with different phases and/or additional phases corresponding to one or more symbols. Each set of signal pulses with a corresponding phase shift may represent only a single symbol. Thus, by modulating signals with smaller phase shifts, such as below 90°, it is possible to increase the number of symbols that may be transmitted within a given period of time.

As illustrated in FIG. 3, the signal pulses of set 54 are 90° out of phase with respect to the signal pulses of set 52. The region, wherein the last pulse of set 52 ends and the first pulse of set 54 begins is referred to, in this context, as the phase transition region.

The number of pulses representing each QPSK symbol depends, at least in part, on the carrier or modulating frequency at the transmitter. For example, for one embodiment in accordance with the invention directed to cable TV applications, as described in more detail with reference to FIG. 8, the data rate is 1.62 mega (M)bits/s. For a QPSK transmission, this data rate corresponds to a symbol rate of approximately 0.81 mega(M)Symbols/s. A typical carrier frequency may be 29.16 MHZ. For this QPSK transmission, each set of signal pulses 52 through 56 contains 36 pulses corresponding to the same phase or symbol. Stated another way, each symbol corresponding to one set of signal pulses, spans 36 pulse cycles of a 29.16MHz carrier.

Figure 1:
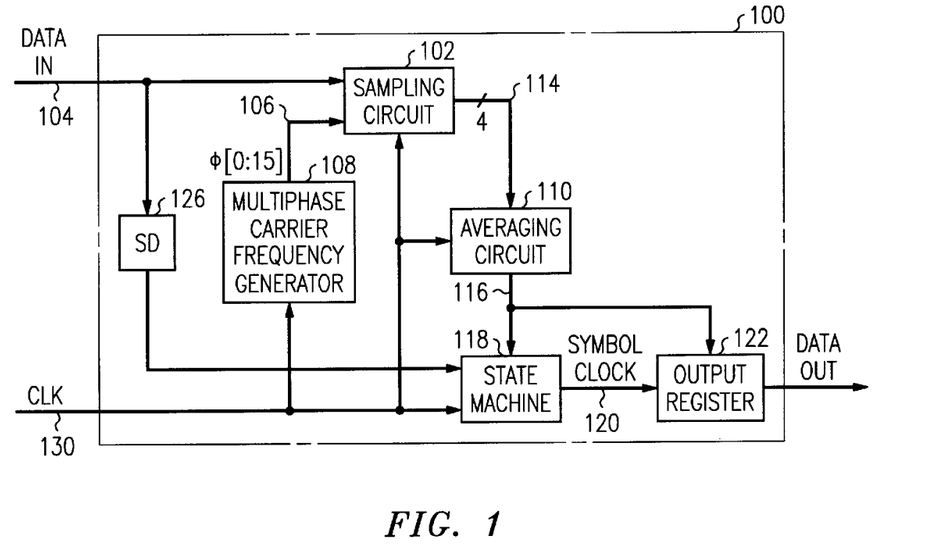
FIG. 1 is a schematic diagram illustrating one embodiment of an MPSK demodulator in accordance with the present invention.

FIG. 1 illustrates the embodiment of an MPSK demodulator 100 in accordance with the present invention. Demodulator 100 processes incoming signal pulses in the passband frequency range without first down converting these signals to the baseband frequency region. A multiphase sampling circuit 102 receives the incoming signal pulses sequentially from data input line 104. A multiphase carrier frequency generator 108 provides N phase shifted clocks or clock signals at the carrier frequency, N being a positive integer, over a multiphase bus 106, which is coupled to the sampling circuit 102. The output signal of sampling circuit 102 is a digital word representing the phase of each set of incoming signal pulses. This digital word is provided to a data bus 114, which in turn is coupled to an averaging circuit 110.

The output signal of the averaging circuit is provided for the use of a state machine 118 over a data bus 116. State machine 118 is used to determine a symbol clock. This symbol clock, as will be explained in more detail hereinafter, is used to sample the digital word signals provided as an output signal by averaging circuit 110. In this context, the symbol clock refers to a clock signal used to determine when it is desirable for these digital words provided by the averaging circuit 110 to be read from output register 122. The symbol clock starts at substantially the midpoint of a phase transition region. As mentioned previously, the phase transition region is the region where the phase of one set of signal pulses changes to another phase corresponding to a new set of signal pulses. Data at output register 122 is sampled at substantially the center region of a set of pulses. This approach is desirable in that it improves the integrity of the signal obtained based on the digital word sampled. State machine 118, which at least in part functions as a clock generator, provides the determined symbol clock to output register 122 via clock line 120.

A signal detector 126 is coupled to the incoming data line at one end and to state machine 118 at its other end. Signal detector 126 generates a trigger signal when it senses an incoming signal burst. MPSK demodulator 100 has a clock input that provides system clock pulse timing to multiphase carrier frequency generator 108, multiphase sampling circuit 102, averaging circuit 110 and state machine 118 via a system clock bus 130. It will be appreciated by those skilled in the art that the present invention is not limited in scope to any particular circuit identified with reference to FIG. 1. In accordance with one embodiment of the invention, multiphase carrier frequency 108 comprises a current-controlled ring oscillator, such as described in concurrently filed patent application, incorporated herein by reference entitled "Ring Oscillator," (Lakshmikumar 5) filed on Jul. 31, 1995 by Lakshmikumar, and assigned to the assignee of the present invention. In one embodiment, the ring oscillator may include at least two delay units, each having an input stage with a first and a second input port and a first and a second output port. Within a delay unit, a capacitor may be coupled to the first output port and a second capacitor may be coupled to the second output port. Likewise, within a delay unit, a latch may be coupled to these two capacitors so as to provide regenerative feedback for accelerating the switching time across the capacitors. The latch in combination with the capacitors allow the ring oscillator to maintain a substantially linear frequency/current characteristics, as described in more detail in the aforementioned patent application.

Multiphase sampling circuit 102 in accordance with one embodiment of the present invention is described in more detail with reference to FIGS. 1 and 4. The sampling circuit includes a bank of first stage flip-flops 140 that receive incoming signal pulses in parallel, from data input line 104. The clock signals to these flip-flops are generated by multiphase carrier frequency generator 108 and sent to the flip flops via multiphase bus 106. As previously mentioned, the multiphase carrier frequency generator 108 of FIG. 1 generates N phase shifted clock signals, N being a positive integer. For the QPSK example of this embodiment, there are 16 phase shifted clocks, designated $\phi_0$ through $\phi_5$. The value of N depends on the M-ARY phase shift keying scheme, and is determined, at least in part, by the phase resolution needed to discriminate the presence of M different phases in accordance with the modulation scheme employed.

For this embodiment, the sampling operation performed by multiphase clocks $\phi_0$ through $\phi_{15}$ is illustrated in FIG. 3. As mentioned previously, each signal pulse in a set of 36 signal pulses, represent one symbol, in this particular embodiment. This signal pulse is sampled by the multiphase clock signals. This sampling is accomplished by flip-flops 140, which receive the incoming signal pulses, corresponding to a symbol. Each flip-flop in the bank of flip-flops 140 receives the same signal pulse, at a time, corresponding to a received symbol. The output ports of flip-flops 140 provide 16 sampled bits of each signal pulse. Each signal pulse comprises a "high" level portion and "0" level portion as illustrated in FIG. 3. Thus, the 16 phase shifted clock signals may sample eight "1's" and eight "0's". Depending on the phase of the incoming signal pulses and the time the sampling by the 16 phase shifted clocks begins, the resultant data word may have eight consecutive "1's" or "0's". This type of data word is known as a thermometer code. Because the location of 1's and 0's rotate within a digital data word, the resulting digital words are referred herein as "rotating thermometer codes." Each generated digital word in accordance with this "rotating thermometer code" corresponds to the phase of an incoming signal pulse. Thus, the incoming signal pulses are converted from an incoming phase to a digital word. As illustrated in FIG. 3, each one of the 36 pulses in a set of signal pulses is converted to a digital word 30. The digital word representing a signal pulse depends, at least in part, on the time when the sampling of the signal pulse begins. Therefore, in one example, illustrated in FIG. 3, the digital word representing a signal pulse with 0° phase is "1111111100000000." The digital word representing a signal pulse with 90° phase is "0000111111110000." The digital word representing a signal pulse with 180° phase is "0000000011111111." And the digital word representing a signal pulse with a 270° phase is "1111000000001111." The invention is, of course, not limited in scope in this respect. Other digital word representations are also possible, as will be appreciated by those skilled in the art.

In certain operating circumstances, the output signal of flip-flops 140 may become indeterminate or metastable. The metastable conditions of first stage flip-flops 140 may lead to errors in determining the digital word corresponding to a phase. In order to substantially reduce the inaccuracy caused by the metastable conditions, in this particular embodiment, a second stage of flip-flops 142 is provided, as illustrated in FIG. 4. An input port of each flip-flop 142 is coupled to the output port of a separate flip-flop 140. The output ports of second stage flip-flops 142 are coupled to a thermometer decoder 144. Thermometer decoder 144 takes the rotating "thermometer" code and produces a 4 bit digital word, in this embodiment, that corresponds to, or represents, the phase of an incoming signal pulse. Thus, sampling circuit 102 operates as a phase decoder. The incoming signal pulses have their information in the phase, and the sampling circuit generates a digital word representing the phase of the incoming signal pulse.

Figure 5:
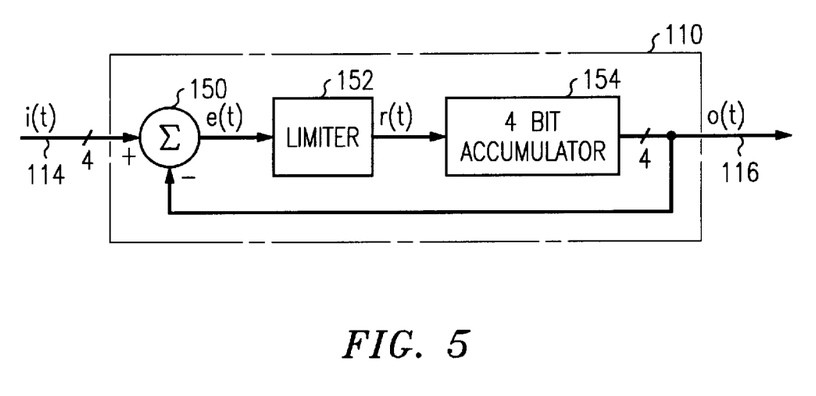
FIG. 5 is a block diagram of one embodiment of an averaging circuit, such as may be incorporated in a MPSK demodulator in accordance with the present invention.

The averaging circuit 110 of FIG. 1 is used to smooth the resultant digital word from sampling circuit 102. FIG. 5 illustrates an embodiment of the circuit in accordance to the present invention. The circuit includes a comparator 150 coupled to a limiter 152. Limiter 152 may have one of many available design arrangements. For example, in one embodiment of the present invention, limiter 152 may be a logic circuit that generates "1" when it receives a positive signal, generates "−1" when it receives a negative signal, and generates "0" when it receives a zero signal. In this embodiment, the output signal of the limiter is passed to a 4-bit accumulator 154. The output signal of the accumulator is coupled to state machine 118 of FIG. 1. This output signal is also fed back to comparator 150. In operation, the averaging circuit receives a digital word, I(t), from the sampling circuit. The comparator compares this digital word with a 4-bit accumulator word, o(t), stored in accumulator 154. The resultant difference, e(t), may be positive, negative or zero. This difference is passed through limiter 152 to allow a change, r(t), equal to +1, −1, or 0 in the accumulator stage. The averaging circuit operates as a filter that smooths the phase transition of incoming data.

The operation of the averaging circuit in conjunction with the thermometer decoder is explained in more detail hereinafter. Thus, for example, a first set of 36 signal pulses first may be decoded by thermometer decoder 144. During this time, the contents of accumulator 154 is some undetermined digital word. Each signal pulse corresponding to the same symbol, has substantially the same phase. Thus, the thermometer decoder, ideally generates the same word 36 times. After a few iterations in the averaging circuit, the output signal of the accumulator should finally become the same as the digital word representing the phase of the incoming signal pulse. The next set of 36 pulses may correspond to a different symbol and, therefore, may have a different phase. The output signal of the thermometer decoder may, thus, be a different digital word. The difference between each digital word corresponding to this second set of 36 pulses and the digital word output signal of the accumulator may be more than "1". Thus, the output signal of comparator may exceed "1". However, the limiter limits the difference to "one." The accumulator, thus, increments by "one" only. Therefore, depending on the phase difference between the first set of signal pulses and the second set of signal pulses, it may take a few signal pulses from the second set of pulses, before the accumulator produces the same digital word as the thermometer decoder.

For a MPSK demodulator in accordance with the present invention, the averaging circuit requires at most N/2 steps to make a transition from one digital word corresponding to one phase to another digital word corresponding to another phase, where N is the number of phase shifted sampling clocks. For example, for the embodiment described herein, a phase transition of 180° would require 8 steps within the averaging circuit, before the output signal of the circuit reflects such a transition. For a 4-bit thermometer code, 180° phase difference translates to a difference of "eight" between the digital words corresponding to these signal pulses. Thus, it takes eight iterations through the averaging circuit before the output signal of the accumulator reflects this difference, as explained above.

The operation of the averaging circuit prevents the system from responding to transitions due to noise. Since such transitions cannot maintain a continual accumulation in the averaging circuit, the final output signal of the averaging circuit would not step up or down a given number of counts to indicate a real transition. It will be appreciated by those skilled in the art that the present invention is not limited in scope to the averaging circuit described herein. A suitable digital filter for smoothing transitions from one set of signal pulses to the other may replace averaging circuit 110.

Figure 6A:
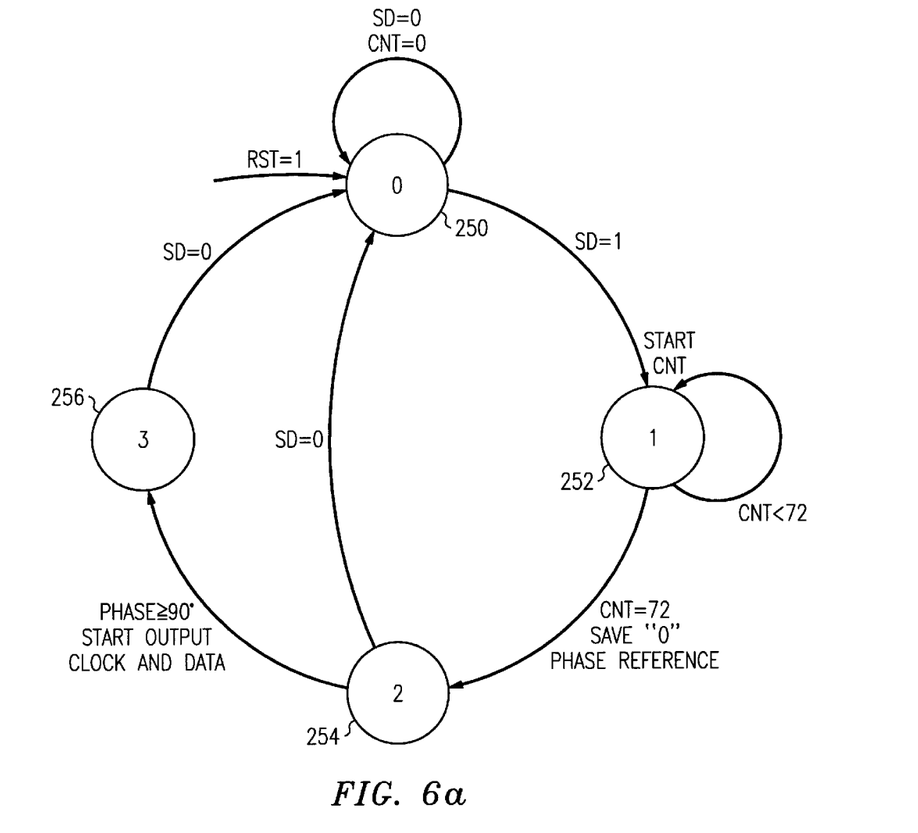
FIG. 6a is a state diagram for a state machine, such as may be implemented in an embodiment of an MPSK demodulator in accordance with the invention.
Figure 6B:
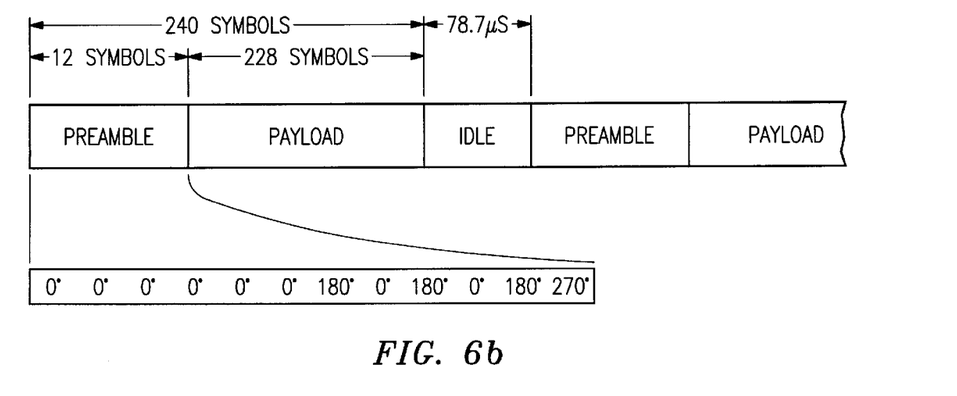
FIG. 6b illustrates one embodiment for organizing signal bursts, such as may be implemented in conjunction with an embodiment of an MPSK demodulator in accordance with the invention.

FIG. 6*a* is a state diagram illustrating the operation of state machine 118. FIG. 6*b* illustrates an embodiment for organizing signal pulses, such as may be employed in conjunction with an MPSK demodulator in accordance with the invention, although the invention is not limited in scope to this particular format. For this embodiment of the invention, signal pulses are organized into bursts or frames of information packets, as illustrated in FIG. 6*b*. In this particular embodiment, each burst or frame includes a preamble portion containing 12 sets of signal pulses, corresponding to 12 symbols, and a payload portion containing 228 sets of signal pulses, corresponding to 228 symbols. There is an idle period of a given duration between consecutive frames. The preamble of each frame contains a group of predetermined symbols. For example, as illustrated in FIG. 6*b*, each preamble includes six symbols of 0° phase, followed by one symbol of 180°, followed by another 0°phase symbol, followed by 180° phase symbol, followed by 0° phase symbol. The preamble ends with a 270° phase. Of course, any group of symbols may be employed. State machine 118 uses the preamble portion of each incoming frame to determine the proper symbol clock for retrieving the appropriate digital word that corresponds to the phase of symbols contained in the payload portion of each frame, as explained in more detail hereinafter.

During operation, the MPSK demodulator 100 remains in an idle state until it detects an incoming signal pulse. During this idle state, state machine 118 remains in its "zero" state, referred to as state 250 in FIG. 6*a*. The state machine, during this stage, sets an internal counter (not shown) to "zero." Upon detecting a signal pulse at data input line 104, signal detector 126 of FIG. 1 transmits a signal-detect (SD) signal to state machine 118. In response to the SD signal, state machine 118 transitions to the next state, referred to as state 252 in FIG. 6*a*. At this time, state machine 118 begins receiving 4-bit digital data words from averaging circuit 110 of FIG. 1. The state machine also triggers the internal counter to begin counting the incoming signal pulses. After receiving a few sets of signal pulses, the averaging circuit 110 achieves a steady state. In one embodiment of the invention, the state machine is adapted to increment the counter 72 times before it considers that averaging circuit 110 is in steady state. In this embodiment, 72 counts correspond to two sets of signal pulses or two symbols. During this time, MPSK demodulator 100 receives 36 signal pulses of 0° phase, each pulse representing 0° phase symbol. Thus, the averaging circuit should receive 36 cycles of the same digital word. After a few cycles, the output signal of signal averaging circuit 110 will therefore be the same as its input signal.

Figure 4:
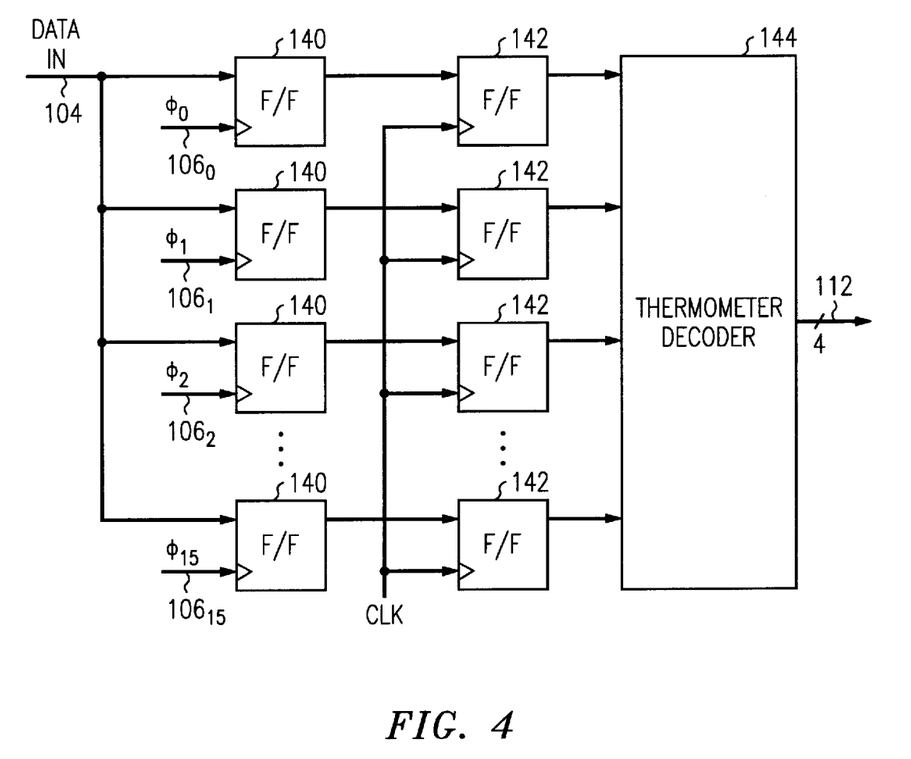
FIG. 4 is a block diagram illustrating an embodiment of a multiphase sampler, such as may be incorporated in the embodiment illustrated in FIG. 3.

After these 72 counts, the state machine transitions to state 254 and triggers a register (not shown) to store a digital word from data bus 116 of FIG. 1. The register (not shown) stores this word as a 0° phase reference, and is referred to, in this context, as a phase reference register. The digital word corresponding to this 0° phase reference could be any one of sixteen possible digital words "0000" through "1111"

provided by the thermometer decoder 144 of FIG. 4. For this embodiment, this 0° phase reference is "0000." It will be appreciated that for this example, thermometer code "0100" corresponds to 90° phase signal, "1000" corresponds to 180° phase signal and "1100" corresponds to 270° phase signal, although the scope of the invention is not limited in this respect. In one embodiment of the QPSK demodulator in accordance with the present invention, binary numbers "0000" to "0011" (decimal 0–3) are identified to correspond to a 0° phase reference. Binary numbers "0100" to "0111" (decimal 4–7) are identified to correspond to a 90° phase reference. Binary numbers "1000" to "1011" (decimal 8–11) are identified to correspond to a 180° phase reference. Finally, binary numbers "1011" to "1111" (decimal 12–15) are identified to correspond to a 270° phase reference.

The MPSK demodulator at this time is still receiving signal pulses or symbols in the preamble portion of an incoming frame. At some point, the phase of an incoming burst signal makes a transition from 0° phase to 180° phase, as illustrated in FIG. 6*b*. In response to this transition, the input port of the averaging circuit should receive 36 signal pulses having an 180° phase. The transition from 0° phase to 180° phase causes the 4-bit accumulator 154 to increment one bit at a time. The state machine compares the output signal of the accumulator with the digital word corresponding to 0° phase. A difference of 4 indicates the phase has made a transition from 0° to 90°.

Upon detecting 4 increments from the averaging circuit, the state machine triggers the beginning of the output symbol clock and transitions to state 256. The symbol clock is used to sample the digital words in output register 122. Digital words stored in register 122 are sampled at the falling edge of the symbol clock signal, in this particular embodiment, although the invention is not limited in scope in this respect. Each sampled digital word is compared with the digital word representing a 0° phase reference. A difference of 4 indicates a 90° phase shift. A difference of 8 indicates a 180° phase shift. A difference of 12 indicates a 270° phase shift.

The state machine remains in state 256 until it detects two transitions from 180° phase to 0° phase followed by one transition from 1800 phase to 270° phase, as illustrated in FIG. 6*b*. The remaining incoming bursts are attributed to the payload portion of the incoming data. Once the state machine detects an idle period between two incoming frames it goes back to state 250 and begins the above described process again. Thus, the preamble portion of each burst or frame is used to determine a symbol clock for sampling the symbols in the payload portion of each frame or burst.

Figure 7:
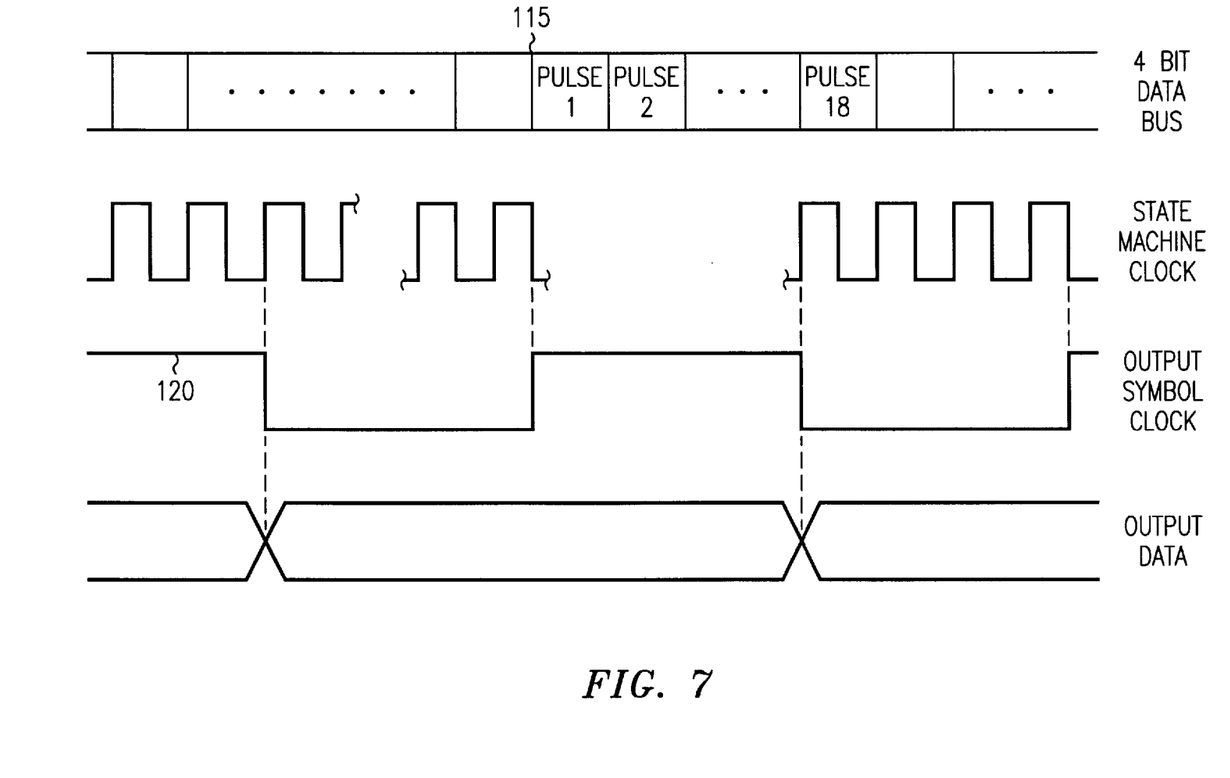
FIG. 7 is a timing diagram illustrating the operation of a 4 bit data bus in relation to a state machine clock, an output symbol clock and an output data stream for the embodiment of MPSK demodulator in accordance with the present invention illustrated in FIG. 1.

FIG. 7 is a timing diagram of a 4-bit data bus, such as bus 116 in FIG. 1, in relation to the state machine clock, an output symbol clock and the output data stream. As illustrated, the rising edge of the symbol clock initially aligns to a phase transition region from 0° phase to 180° phase. This occurs during a transition region 115. The data in output register 122 is sampled at the falling edge of the output clock. This assures that the data is sampled at the eighteenth pulse signal, for this example, of each set of 36 pulse signals rather than the beginning of the set or symbol, to reduce the possibility of error. It will be appreciated that the operation of state machine 118 may be accomplished in both hardware or software. For example, a look-up read only memory (ROM) may be used to implement the state machine, including generating the output symbol clock, and output signals corresponding to each of the states illustrated in FIG. 6*a*.

Figure 8:
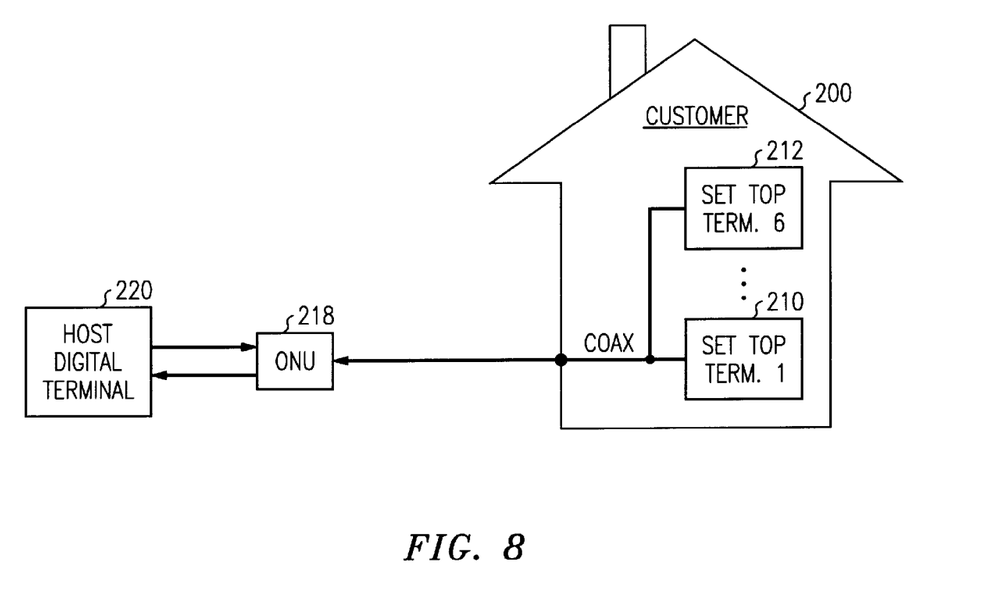
FIG. 8 is a block diagram illustrating a further embodiment in accordance with the present invention.

A MPSK demodulator in accordance with the present invention may be employed in a variety of communication systems. A digital approach conveniently permits the manufacture of an MPSK demodulator in accordance with the invention as an integrated circuit, and allows use in a receiver employing MPSK demodulation. FIG. 8 illustrates one example of a communication system wherein demodulator 100 of FIG. 1 may be used, although the invention is not limited in scope to this application. In FIG. 8, an interactive television environment is shown, wherein customers may receive and transmit information back and forth to a host. For example, customer house 200 may include six set top terminals, such as 210 or 212, for allowing six users within the same household to communicate with the outside world. A plurality of customer houses 200 may be coupled to an optical network unit (ONU) 218 located at the curb side in the vicinity of the houses. The optical network unit may in turn be coupled, via optical fibers, to a host digital terminal 220, which receives signals originating from each one of the set top boxes in the system. These set top boxes may transmit QPSK modulated signals to optical network unit 218. Optical network unit 218 may contain an embodiment of a MPSK demodulator in accordance with the invention, such as a QPSK demodulator, which demodulates these signals in the passband frequency region without first shifting the signals into a baseband frequency region.

Thus, an MPSK demodulator in accordance with the present invention allows MPSK demodulation without resorting to down conversion at the receiver. The phase of each incoming pulse signal is converted into a corresponding digital word. This arrangement allows for a substantially fast determination of a symbol clock signal. Thus, a MPSK demodulator in accordance with the present invention may be useful in a burst mode communication environment, where it is desirable to acquire the symbol clock for each incoming frame quickly. Likewise, because an MPSK demodulator in accordance with the present invention does not require extensive analog circuitry, it lends itself, conveniently, to a robust integrated circuit arrangement. An embodiment may also include an efficient filtering arrangement, for smoothing signal bursts during transitions from one burst with a given phase to another burst with a different phase, as previously described.

While only certain features of the invention have been illustrated and described herein, many modifications, substitutions, changes or equivalents will now occur to those skilled in the art. It is therefore, to be understood that the appended claims are intended to cover all such modifications and changes as fall within the true spirit of the invention.

We claim:

1. A receiver for decoding passband signal pulses transmitted in accordance with a M-ARY phase shift keying modulation scheme, comprising:

a multiphase sampler for sampling said passband signal pulses in the passband frequency range so as to generate a plurality of digital words corresponding to said sampled passband signal pulses, said digital words representing the phase of said sampled passband signal pulses; and a phase reference storage means coupled to said multiphase sampler for storing one digital word from said digital words as a phase reference such that other digital words generated by said multiphase sampler are compared with said digital word corresponding to said phase reference for decoding said passband signal pulses.

2. The receiver according to claim 1, further comprising:

an output clock generator coupled to said multiphase sampler so as to receive said digital words, including digital words generated in response to a predetermined set of said passband signal pulses, so as to generate a symbol clock signal; and an output signal register coupled so as to receive said symbol clock signal to retrieve selected digital words in accordance with said symbol clock signal.

3. The receiver according to claim 2, further comprising a multiphase frequency generator configured to generate a plurality of phase shifted clock signals coupled so as to provide said multiphase sampler said phase shifted clock signals.

4. The receiver according to claim 3, wherein said multiphase sampler comprises a latch circuit coupled so as to receive said phase shifted clock signals, for sampling said passband signal pulses in response to said phase shifted clock signals so as to generate said digital words corresponding to said passband signal pulses.

5. The receiver according to claim 4, wherein said multiphase sampler further comprises a thermometer decoder, coupled to said latch circuit, for converting at least one of said digital words to a second digital word corresponding to the phase of said passband signal pulses.

6. The receiver according to claim 5, wherein said latch circuit comprises a first set of latches for receiving said passband signal pulses and a second set of latches having a set of input and output ports, said input ports of said second set of latches being coupled to said first set of latches and said output ports of said second set of latches being coupled to said thermometer decoder.

7. The receiver according to claim 5, wherein the output signal of said thermometer decoder is coupled to an averaging circuit so as to generate a filtered version of said second digital word, said averaging circuit being coupled so as to provide said filtered version of said second digital word to said output clock generator.

8. The receiver according to claim 7, wherein said averaging circuit comprises:

a comparator including a first and a second input port, said first input port coupled so as to receive the output signal of said thermometer decoder;

a limiter coupled to said comparator for providing a predetermined adjustment signal in response to an output signal provided by said comparator; and an accumulator coupled to said limiter, for adjusting the contents of said accumulator in accordance with said predetermined adjustment signal, the output port of said accumulator being coupled to said second input port of said comparator so as to form a feedback loop, the output port of said accumulator also being coupled to said output clock generator.

9. The receiver according to claim 8, wherein said limiter is adapted to provide said predetermined adjustment signal comprising an increment when the output signal of said comparator comprises a positive signal, a decrement when the output signal of said comparator comprises a negative signal and no increment or decrement when the output signal of said comparator comprises a "0" signal.

10. The receiver according to claim 9, wherein said increment and said decrement comprise a binary "1".

11. The receiver according to claim 10, wherein said output clock generator comprises a state machine.

12. The receiver according to claim 11, wherein said state machine being configured to transition between the following states:
- a first idle state during which said state machine awaits detection of incoming predetermined signal pulses;
- a second state entered in response to the detection of incoming predetermined signal pulses, wherein said state machine remains in said second state a predetermined number of clock pulses; and
- a third state entered after said predetermined number of clock pulses, said state machine being configured to generate an output symbol clock signal when the contents of said averaging circuit is incremented by a predetermined amount.

13. The receiver according to claim 5, wherein the output signal of said thermometer decoder is coupled to a digital filter so as to generate a filtered version of said second digital word to said output clock generator, said digital filter comprising:
- a comparator including a first and a second input port, said first input port being coupled so as to receive said second digital word;
- a limiter coupled to said comparator for providing a predetermined adjustment signal in response to an output signal provided by said comparator; and
- an accumulator coupled to said limiter, such that said predetermined adjustment signal is added to a preexisting content of said accumulator for adjusting the contents of said accumulator in accordance with said predetermined adjustment signal, the output port of said accumulator being coupled to said second input port of said comparator so as to form a feedback loop.

14. The receiver according to claim 13, wherein said limiter is adapted to provide said predetermined adjustment signal comprising an increment when the output signal of said comparator is a positive signal, a decrement when the output signal of said comparator is a negative signal and no increment or decrement when the output signal of said comparator is a "0" signal.

15. The receiver according to claim 14, wherein said increment and said decrement comprise a binary "1".

16. A method for demodulating MPSK signal bursts, each burst including periodic signal pulses, said method comprising the steps of:
- sampling said signal pulses so as to generate digital words, each generated digital word representing the phase of a sampled signal pulse;
- generating a symbol clock signal corresponding to digital words generated in response to a predetermined set of said signal pulses; and
- retrieving a plurality of said digital words in accordance with said symbol clock signal.

17. The method according to claim 16, wherein the step of sampling further comprises the steps of:
- providing a plurality of clock signals shifted in phase; and
- comparing said plurality of clock signals shifted in phase with said signal pulses so as to generate said digital words.

18. The method according to claim 17, further comprising the step of converting said digital words to another digital word format corresponding to the phase of said signal pulses.

19. The method according to claim 18, further comprising the step of generating a filtered version of said converted digital words.

* * * * *